United States Patent [19]

McGuire

[11] Patent Number: 5,007,483
[45] Date of Patent: Apr. 16, 1991

[54] HOOF-BUFFING TOOL KIT FOR FARRIERS

[76] Inventor: Douglas K. McGuire, 39609 Luckiamute Rd., Philomath, Oreg. 97370

[21] Appl. No.: 151,764

[22] Filed: Feb. 3, 1988

[51] Int. Cl.⁵ ............................................. A01L 11/00
[52] U.S. Cl. ...................................... 168/48.1; 51/391
[58] Field of Search .......................... 132/76.4, 76.5; 206/581; 168/48.1, 48.2; 51/363, 370, 391, 392, 401, 406

[56] References Cited

U.S. PATENT DOCUMENTS

| | | | |
|---|---|---|---|
| 2,550,393 | 4/1951 | Wurfschmit | 51/391 |
| 2,626,489 | 1/1953 | Thompson | 51/391 X |
| 2,734,320 | 2/1956 | Hoye | 51/392 |
| 3,998,012 | 12/1976 | Ness | 51/391 |
| 4,640,060 | 2/1987 | Lukianoff | 51/391 |

FOREIGN PATENT DOCUMENTS 79928 12/1950 Czechoslovakia ................ 132/76.4

*Primary Examiner*—Robert P. Swiatek
*Attorney, Agent, or Firm*—Jack E. Day

[57] ABSTRACT

The present invention is a buffing kit for use by farriers to impart a high gloss to the hooves of horses and other hooved animals, in competitions and exhibitions. It consists of several rectangular blocks of resilient material having replaceable sheets of abrasive material on the two major faces. The blocks should not be deteriorated by water and soap, and are sized to be easily handheld. The abrasive material ranges from approximately 100 grade to 3600 grade. In use, the farrier wets the abrasive surface and, starting with the coarsest grade, removes the major roughnesses by a buffing procedure. Progressively finer grades are used in turn to obtain the desired finish. Preferably, the two finest grades do not differ from one another substantially. Worn-out sheets are replaced by fresh. Three blocks, with a total of six major surfaces, provide a satisfactory progression in abrasive grades to obtain almost any desired gloss, and will service about five horses.

3 Claims, 1 Drawing Sheet

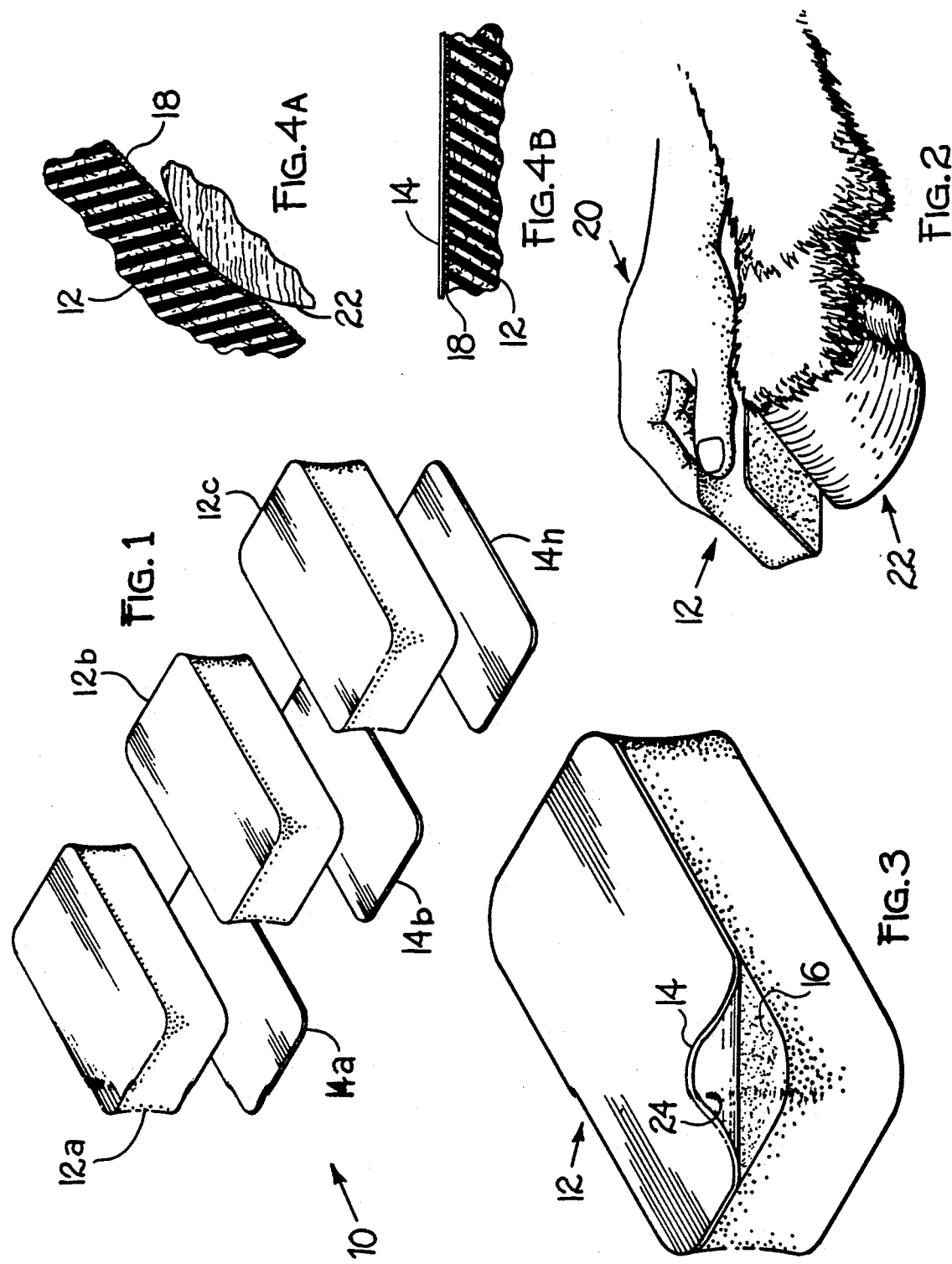

HOOF-BUFFING TOOL KIT FOR FARRIERS

The present invention is, in general, a tool for use by farriers and others who groom horses and, in particular, is a buffing tool kit specifically for imparting a high gloss to horse's hooves.

BACKGROUND OF THE INVENTION

For many years and in many places, it has been the practice of horse lovers to laboriously polish their horse's hooves for exhibition purposes or for other important occasions. This has usually been done by using abrasive or cutting tools such as rasps or files to remove surface roughness from the hooves, and then, with sheets or strips of sandpaper, emery cloth, or other abrasive materials, gradually to reduce the surfaces to the point where polishing materials, such as crocus cloth, can be applied to impart the final high gloss thereto Great care must be used with mechanical tools such as rasps, because of the danger of cutting into the sensitive portion under the surface, and creating the possibility of injury and infection to the animal.

Surprisingly, little has apparently been done toward reducing this task to an orderly, safe and efficient procedure. Such tools as might be useful for this purpose seem to have been designed with other functions in view, as a survey of existing art discloses.

Wright et al U.S. Pat. No. 1,455,559 discloses a rubbing block for mounting thereon sandpaper or other abrasive material. The block contains on the surface thereof shapes which enable a user to sand normally hard-to-get-at surfaces and contours. Wright has no relationship to the present invention, other than disclosing a tool for smoothing difficult surfaces.

Feuerstein U.S. Pat. No. 2,018,611 discloses a sanding tool which consists of a fiber block which has mounted on both principal faces thereof a "pad" of sheets of sandpaper or other abrasive material. When a sheet becomes worn, it can simply be removed and discarded, thus exposing a new sheet and a fresh surface for use. Feuerstein has no relationship to the present invention other than the shape and approximate size of the tool.

Thomas U.S. Pat. No. 2,036,107 discloses a holder for sandpaper, consisting of two blocks which are removably fastened to each other. The two blocks are tightened together to affix the sandpaper in place during use. The only relationship of Thomas to the present invention is that the working face of the block, under the sandpaper, is covered with cork or other resilient material.

Vanderveer U.S. Pat. No. 2,214,515 discloses a sanding tool which has a number of deep narrow parallel grooves therein, which extend nearly through the block. This enables the block to be bent or molded to conform to a non-planar surface, which can then be smoothed more easily than with sandpaper alone, or with sandpaper mounted on a flat block. Vandeveer has no relationship to the present invention, except for the concept of providing a sanding block which can be shaped to fit the contours of a non-planar surface.

Gerhan U.S. Pat. No. 2,414,036 discloses a sanding tool which can be shaped by finger pressure to adapt to other than planar surfaces. Gerhan has no relationship to the present invention except that his block can be formed of tough flexible rubber, which enables it to be conformed to an irregular surface.

Bonkowski U.S. Pat. No. 2,493,852 discloses a sanding tool having a somewhat elliptical longitudinal shape, which is covered with a resilient sleeve, over which is placed sandpaper. Bonkowski has no relationship to the present invention except for disclosing a resilient cushion between the block and the sanding material.

Bell et al U.S. Pat. No. 3,063,208 discloses a sanding tool for making use of an abrasive belt as the abrasive material. Bell et al have no relationship to the present invention except in the disclosure of a resilient cushion under the belt.

Valles U.S. Pat. No. 3,129,540 discloses a resilient sanding tool wherein a folded-up rubber strap holds an abrasive sheet on the outer surface thereof, which folded-up shape approximates the shape of the present invention. Valles discloses only the idea of a resilient, all-rubber block for sanding uneven surfaces.

A well-known sanding tool, available from the 3M Corporation, is fabricated of bits of natural or artificial sponge bindingly compressed into a block of convenient size to be held in the hand, with abrasive particles impregnated into the surfaces thereof. Unfortunately, this block disintegrates when wet, making it impractical for many uses, including the polishing of horse's hooves, where wetting enhances the abrasive action. Also, the abrasive material cannot be replaced; when it is worn smooth, the tool must be discarded.

None of the foregoing references, singly or in any obvious combination, discloses or suggests a kit for use by farriers, which includes a multiplicity of resilient blocks, each having an extended surface which has removably affixed thereon a particular one of several grades of abrasive material, wherein the multiplicity of blocks collectively represents a progression, from coarser to finer, of the abrasive material, the use of which, a buffing operation and in progression, imparts a high gloss to the hooves of horses.

BRIEF DESCRIPTION OF THE PRESENT INVENTION

The present invention is a hoof-buffing kit for the use of farriers and others who groom horses, and is for the purpose of imparting a high gloss to horse's hooves for exhibition and other purposes. It includes a set of resilient blocks, fabricated of a foamed rubber or rubber-like compound, of a size to be held comfortably in the hand. Each of the blocks has on at least one principal face thereof removable and replacable sheets of an abrasive material, exemplified by sandpaper, emery cloth or corundum paper. In use, a farrier would first select a block having an abrasive thereon of a fairly coarse grade, sufficient to remove the most prominent flaws on the hoof. He would then use progressively finer and finer grades of abrasive until the desired gloss had been obtained. The abrasive material can be wetted if desired or needed.

It has been found that a kit of three blocks, having among them six principal surfaces giving six grades of abrasive materials, will be adequate to reduce all but the most badly scarred hooves to a high gloss, when starting with 100 grade abrasive and finishing with 3,000 or finer grade. Such a kit can be used satisfactorily for polishing about twenty hooves (5 horses) before the abrasive needs to be replaced. The average rough hoof can be finished in about *$x$* minutes, saving a great deal of time and energy, and greatly reducing the possibility of injury to the horse.

BRIEF DESCRIPTION OF THE DRAWINGS

FIG. 1 discloses a general view of the kit of the present invention.

FIG. 2 discloses a general view of one of the blocks of the present invention, as used by a farrier on the hoof of a horse.

FIG. 3 discloses an oblique general view of one of the blocks of the present invention, disclosing the structure thereof.

FIGS. 4A and 4B disclose aspects of the surface characteristics of one of the blocks of the present invention as they relate to the resiliency of the block material.

DETAILED DESCRIPTION OF THE PRESENT INVENTION

FIG. 1 discloses the present invention 10, which is comprised of a multiplicity of blocks 12a . . . 12n, and several sheets 14a . . . 14n, incorporating on at least one surface 16 thereof abrasive materials 18 of a particular one of several grades, as hereinafter described more completely.

FIG. 2 depicts one of blocks 12a . . . 12n in use. Each block 12a . . . 12n is of a size that can be gripped conveniently by a human hand 20 and, at the same time, covers a substantial portion of a standard-sized horse's hoof 22, as hereinafter described more completely.

FIG. 3 discloses details of one of the blocks 12a . . . 12n, hereinafter referred to as block 12 for simplicity. Block 12 is fabricated of a resilient material, as hereinafter described more explicitly. Applied to at least one principal face 16 of block 12, and held there by adhesive, is a sheet 14 of abrasive particles 18 of a particular one of several grades of abrasive, as hereinafter explained more completely.

Block 12 is fabricated of a suitable resilient material, such as high-density foamed rubber or other suitable elastomer. The block material should be:

sufficiently resilient that the surface thereof macroscopically conforms substantially to the curvature of a substantial portion of the surface of an average hoof, as illustrated in FIG. 4A; yet sufficiently stiff that adequate resistance is offered to microscopic deformation of the surface so that the abrasive particles can perform their cutting function efficiently, as illustrated in FIG. 4B.

FIG. 4A illustrates the desired effect on block 12 which the pressure of the farrier's hand should have, i.e., block 12 should conform macroscopically to the curve of the surface of hoof 22, for a significant portion of the hoof. This means that a substantial amount of hoof 22 is being polished at any time during the operation.

On the other hand, the resiliency of block 12 should not be so great that sheet 14 is permitted to deform microscopically, so that the particles of abrasive 18 are able to "rock" back and forth as block 12 is vigorously applied to hoof 22. It will be seen by those skilled in the art that sheet 14, backed by block 12 should hold abrasive particles 18 more-or-less rigidly, as disclosed by FIG. 4B.

In the preferred embodiment, the resilient material should also be resistant to deterioration by wetting, as the buffing operation usually works best when the surface of hoof 22 is wet.

Abrasive 18 can be any of a number of materials of suitable grade, such as sandpaper, garnet, corundum, etc. An individual horse owner might decide to use common sandpaper, as it is least expensive. However, a professional farrier, working with many horses, might prefer a long-lasting abrasive, such as a corundum cloth or paper, since it retains its cutting qualities much longer than sandpaper, and would therefor require fewer changes, making for less lost time and giving a lower cost per application. Grit size can vary from a first particular grade for the roughest work, i.e., 100 grade, to a second particular grade, i.e., 3,600 grade or finer, for the final polishing operation. Intermediate grades can be distributed according to the farrier's preferences, or in dependence upon whatever is available locally. A representative range of abrasive might be 100, 250, 600, 1,500, and 3,600 grade, and will give satisfactory scratch removal at the start, and a high gloss at the finish. Some users prefer, at the end, to use two grades that are somewhat closer together than suggested, believing that it gives a finer gloss. Rouge paper has even been used for the final polishing, although this is probably more than most persons would need or desire. In any case, a high gloss finish can be obtained without waxing.

The adhesive for retaining abrasive sheet 14 on block 12 can be applied by hand to either backside 24 of sheet 14, or to face 16 of block 12. Either block 12 or abrasive sheet 14 could be provided with adhesive applied thereto, covered by a protective sheet until used. The preferred embodiment is for abrasive sheet 14 to be supplied with adhesive applied thereon. These sheets can be easily protected by packaging against contamination of the adhesive surface by dust and foreign particles. Placing the adhesive on resilient block 12 could render it unusable after several changes of abrasive, as particulate matter collects around the exposed edges of the adhesive, and on the principal face 16 of block 12 whenever abrasive sheet 14 is replaced, seriously deteriorating the adhesive qualities needed. Preferably, the adhesive should be moisture resistant, to avoid the deterioration of the bonding of the abrasive sheet 14 to resilient block 12 between uses.

It has been found that a kit of three blocks, 12a, 12b, and 12c, having six grades of abrasive on the six principal surfaces thereof, are sufficient to obtain the desired gloss, and such a set, using corundum abrasive will satisfactorily finish about twenty hooves (five horses). When the abrasive becomes ineffective, sheets 14a . . . 14n are removed from blocks 12a-12c and new adhesive-backed sheets 14 are affixed thereto.

Several changes and modifications can be made in the several features described herein without avoiding the spirit and intent of the invention. For example, the preferred embodiment of blocks 12a . . . 12n herein would be a right parallelepiped, as shown, with two principal planar faces thereon. Further, they could be fabricated with only one principal face thereon, the opposite side thereof being shaped to fit the user's hand. Also, the principal face 16 need not be planar, but could have a slightly concave or convex shape. Nor would the spirit and intent of the invention be avoided by fabricating block 12 of other than rubber or other elastomers, or of materials which deteriorate under conditions of dampness.

The terms and expressions which have been employed in the foregoing specification are used therein as terms of description and not of limitation, and there is no intention, in the use of such terms and expressions, of excluding equivalents of the features shown and described, or portions thereof, it being recognized that the scope of the invention is defined and limited only by the claims which follow.

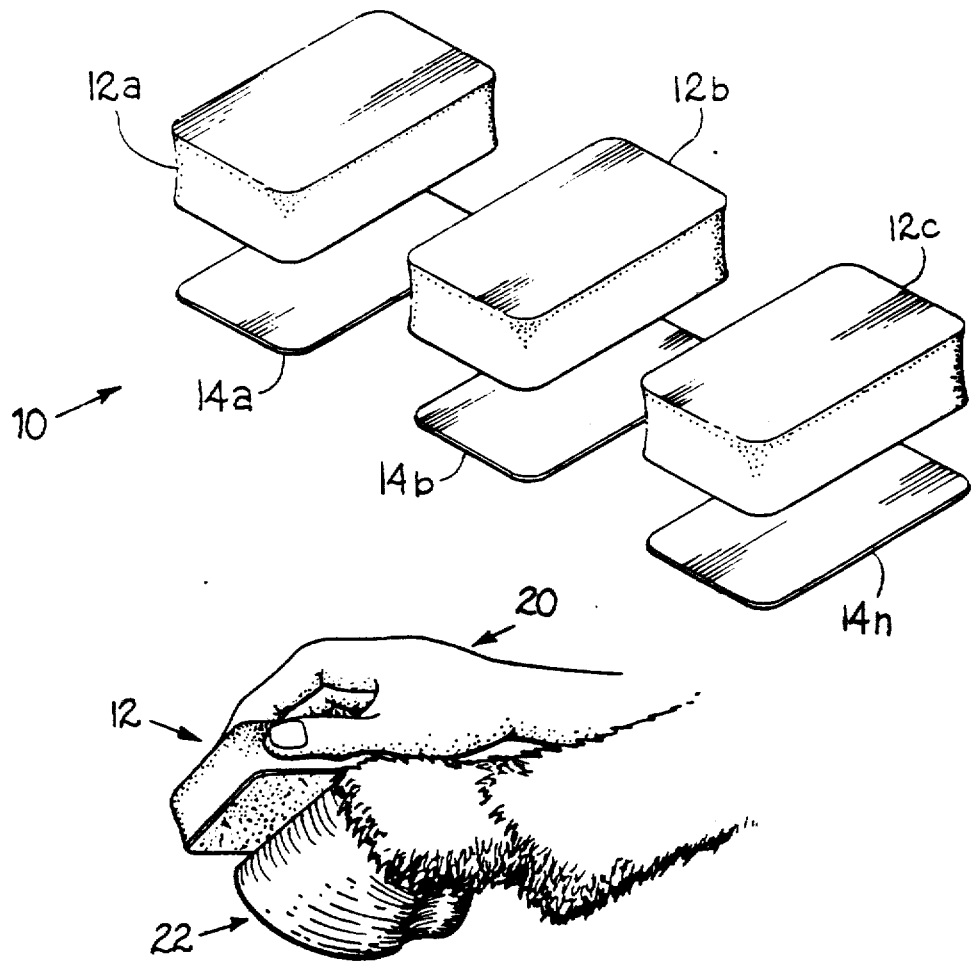

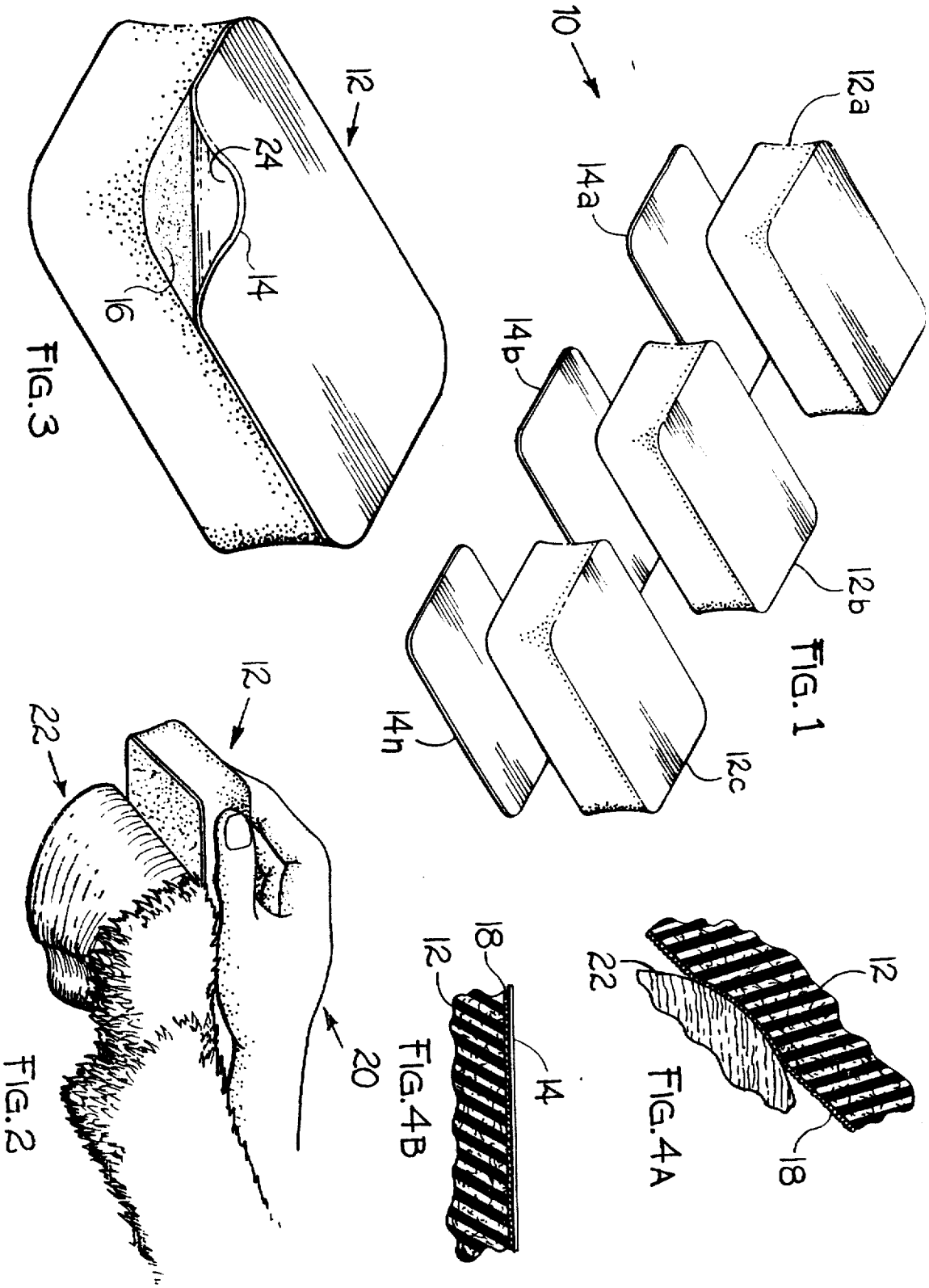

What I claim as my invention is:

1. A kit of farrier buffing tools for imparting a gloss to the curved exterior surface of horse's hooves, comprising:
   a. three resilient blocks of foamed rubber, each block having:
      1. two substantially planar principal surfaces thereon;
      2. each of said surfaces having removably affixed thereto a sheet of a different grade of abrasive material;
   b. said blocks:
      1. collectively representing a progression, from 100 grade to 3,600 grade, of said abrasive material; and
      2. imparting said gloss to said hooves when applied thereto, in order of said progression, in a buffing procedure.

2. A kit of buffing tools for imparting a gloss to the curved exterior surface of horses' hooves, comprising:
   a. a multiplicity of substantially rectangular blocks, each block being:
      1. fabricated of a resilient material; and
      2. of a size to be gripped comfortably by a user's hand; and having
         A. at least two principal faces with substantially planar surfaces hereon:
         B. each of said planar surfaces:
            I. having removably affixed thereto a different one of several grades of abrasive material;
   b. said multiplicity of blocks collectively:
      1. representing a progression, from coarser to finer, of said several grades of said abrasive material; and
      2. imparting said gloss to said hooves when applied thereto, in order of said progression, in a buffing procedure.

3. The kit of farrier buffing tools of claim 1 or 2, wherein said grades of abrasive material thereon are 100, 250, 600, 1500, 3000, and 3600.

* * * * *

UNITED STATES PATENT AND TRADEMARK OFFICE
CERTIFICATE OF CORRECTION

PATENT NO. : 5,007,483

DATED : April 16, 1991

INVENTOR(S) : Douglas K. McGuire

It is certified that error appears in the above-identified patent and that said Letters Patent is hereby corrected as shown below:

The title page should be deleted to be replaced with the title page, as shown on the attached page.

In the drawings, Figs. 1 and 3 should be deleted to be replaced with Figs. 1 and 3, as shown on the attached page.

Signed and Sealed this

Twentieth Day of April, 1993

*Attest:*

MICHAEL K. KIRK

*Attesting Officer*     *Acting Commissioner of Patents and Trademarks*

United States Patent [19]
McGuire

[11] Patent Number: 5,007,483
[45] Date of Patent: Apr. 16, 1991

[54] HOOF-BUFFING TOOL KIT FOR FARRIERS

[76] Inventor: Douglas K. McGuire, 39609 Luckiamute Rd., Philomath, Oreg. 97370

[21] Appl. No.: 151,764

[22] Filed: Feb. 3, 1988

[51] Int. Cl.⁵ .............................................. A01L 11/00
[52] U.S. Cl. ...................................... 168/48.1; 51/391
[58] Field of Search ........................... 132/76.4, 76.5; 206/581; 168/48.1, 48.2; 51/363, 370, 391, 392, 401, 406

[56] References Cited

U.S. PATENT DOCUMENTS

| | | | |
|---|---|---|---|
| 2,550,393 | 4/1951 | Wurfschmit | 51/391 |
| 2,626,489 | 1/1953 | Thompson | 51/391 X |
| 2,734,320 | 2/1956 | Hoye | 51/392 |
| 3,998,012 | 12/1976 | Ness | 51/391 |
| 4,640,060 | 2/1987 | Lukianoff | 51/391 |

FOREIGN PATENT DOCUMENTS 79928 12/1950 Czechoslovakia ................ 132/76.4

Primary Examiner—Robert P. Swiatek
Attorney, Agent, or Firm—Jack E. Day

[57] ABSTRACT

The present invention is a buffing kit for use by farriers to impart a high gloss to the hooves of horses and other hooved animals, in competitions and exhibitions. It consists of several rectangular blocks of resilient material having replaceable sheets of abrasive material on the two major faces. The blocks should not be deteriorated by water and soap, and are sized to be easily handheld. The abrasive material ranges from approximately 100 grade to 3600 grade. In use, the farrier wets the abrasive surface and, starting with the coarsest grade, removes the major roughnesses by a buffing procedure. Progressively finer grades are used in turn to obtain the desired finish. Preferably, the two finest grades do not differ from one another substantially. Worn-out sheets are replaced by fresh. Three blocks, with a total of six major surfaces, provide a satisfactory progression in abrasive grades to obtain almost any desired gloss, and will service about five horses.

3 Claims, 1 Drawing Sheet